United States Patent

[11] 3,633,064

[72] Inventor Elvin E. Herman
 Pacific Palisades, Calif.
[21] Appl. No. 48,237
[22] Filed June 22, 1970
[45] Patented Jan. 4, 1972
[73] Assignee Hughes Aircraft Company
 Culver City, Calif.

[54] SIGNAL CONVERTING SYSTEM USING BARRIER GRID-TYPE STORAGE TUBE
 6 Claims, 3 Drawing Figs.

[52] U.S. Cl. ..................................................... 315/12,
 313/66, 313/67, 313/68 R, 313/89
[51] Int. Cl. ...................................................... H01j 29/41
[50] Field of Search .......................................... 313/66, 68
 R, 89, 67; 315/12

[56] References Cited
UNITED STATES PATENTS

| | | | |
|---|---|---|---|
| 3,493,803 | 2/1970 | Koda et al. .................... | 313/68 R |
| 2,538,836 | 1/1951 | Jensen .......................... | 315/12 |
| 2,896,106 | 7/1959 | Burns et al. ................... | 313/89 |

Primary Examiner—Rodney D. Bennett, Jr.
Assistant Examiner—S. C. Buczinski
Attorneys—James K. Haskell and Robert H. Himes

ABSTRACT: A single-gun converter tube having a barrier grid-type storage target including a thin dielectric member of high-electrical resistivity and having a conductive grid on the surface thereof which faces a scanning electron gun for "writing," "reading" and "erasing" information on the dielectric member by a charging action which takes place transversely to the axis of the electron beam and a backing electrode on the thin dielectric member for priming the storage surface thereof by means of capacity division and potential division.

SIGNAL CONVERTING SYSTEM USING BARRIER GRID-TYPE STORAGE TUBE

BACKGROUND OF THE INVENTION

This invention relates primarily to storage tubes, and particularly to the type utilizing a storage target whereby electrical signs may be stored for some predetermined period and subsequently readout. More particularly, the present invention relates to storage tubes of the "scan conversion" type whereby electrical signals representing one pattern or one frequency domain can be converted into electrical signals representing a different pattern or signals of a different frequency domain.

Scan conversion storage tubes and systems are useful, for example, where it is desired to present a radar-type display at television scan frequencies. However, the radar signals are derived by a different and extensively slow scanning frequency in comparison with television frequencies. For example, the well-known P.P.I. radar scan may have a cycle time of about 10 seconds in comparison with television-type scans which may have a cycle time of one-thirteenth of a second. It is also extremely useful to be able to store electrical signals representing some predetermined information and to repeatedly read these stored signals to provide a continuous picture.

It will therefore be appreciated that a suitable electronic or electrical conversion system must employ some means for storing electrical signals (e.g., the slower scan signals) while permitting these signals to be read out as often as desired and/or at a different scan rate or in a different coordinate system. Storage tubes capable of performing such a function have been provided heretobefore but have been characterized by some rather undesirable features. In general, many of the storage tubes of the prior art useful for these purposes (usually referred to as "scan-converters") have utilized a storage target comprising a perforated conducting screen having a coating of secondary emissive dielectric material on one side thereof. In one type of scan-converter tube, this target is disposed between a pair of opposed electron guns. One gun, called the "writing" gun, scans the coated side of the target at one scan frequency, for example, to thereby and thereon establish a stored charge pattern by secondary emission, representative of the input signals; the other gun, called the "reading" gun, scans the uncoated side of the target at a different scan frequency and, in effect, penetrates the storage target and is modulated in accordance with the stored charge pattern. The varying electron current of the "reading" beam thus obtained may be utilized to provide an electrical output signal corresponding to the charge pattern and hence of the original input signals. Such a tube is shown and described in U.S. Pat. No. 2,547,638 to B. C. Gardner. A related type of scan-converter tube which achieves the same function employs only one electron gun and a solid metallic plate having a secondary electron emissive coating thereon with a mesh electrode in contact therewith on the side facing the electron gun. This tube is the so-called "barrier grid storage tube" and is shown and described in U.S. Pat. No. 2,538,836 to A. S. Jensen. Unlike the present system, in this tube the input signals to be stored are normally applied directly to the metallic plate during bombardment of the dielectric by the scanning electron beam.

A single-ended scan-converter tube which utilizes a single electron gun for performing both "writing" and "reading" function is disclosed in U.S. Pat. Re. No. 24,776 to R. C. Hergenrother. In this tube the target comprises a glass substrate covered with a layer of calcium tungstate with a mesh electrode adjacent thereto but spaced therefrom.

In U.S. Pat. No. 2,728,020, L. Pensak discloses a double-ended scan-converter tube which, like the aforementioned Gardner patent, utilizes two cathode-ray guns with the storage target disposed therebetween, with one gun being used for "writing" and the other for "reading." In one embodiment Pensak discloses a target comprising a thin continuous dielectric layer of mica having a fine conductive grid or screen on one side of the mica sheet. In another embodiment Pensak discloses a thin continuous dielectric layer of glass disposed on an electrically conductive support mesh. According to Pensak's patent, the tube, in either embodiment, is operated by scanning the dielectric side of his target with an electron beam to "write" or store information thereon. "Reading" is accomplished by scanning the mesh side of the target with a second electron beam. While not expressly described by Pensak in his patent, the charge-storing mechanism is now known to be due to a capacitive effect in the thickness dimension of the dielectric between the surface thereof struck by the "writing" beam and the mesh conductor or wire on the opposite side of the dielectric. "Reading" is accomplished by means of the influence of the electric fields resulting from this capacity charging effect on the "reading" beam scanning the mesh side of the target, the electric fields being able to exert such influence through the interstices in the mesh. There is no teaching or suggestion in Pensak's patent that both "reading" and "writing" could be accomplished by a single-electron gun scanning the proper side of the target. One of the disadvantages of Pensak's double-ended scan-converter tube as disclosed is the inability to "erase" stored charges from the "reading" gun side or with the "reading" beam. This is because the discrete charge-storing mechanisms in Pensak's target are opposite the mesh wires which prevents the "reading" beam from being able to act on these charge-storing mechanisms. In other words, the reading beam cannot see or reach the dielectric underlying the mesh structure. Hence, the reading beam is unable to affect, as for erasure, the stored charges. Thus, Pensak's patent discloses a scan-converter tube taught as only being useful with two electron guns having a storage target disposed between the guns.

In U.S. Pat. No. 3,193,803 of N. J. Koda and L. S. Yaggy, scan-converter tubes of either the double-ended or single-ended type are disclosed employing a metallic mesh support member, on one surface of which is disposed a continuous dielectric film. Koda and Yaggy avoid the problem of not being able to erase the target from one side thereof with a single electron gun by utilizing a target having metal diffused through portions of the dielectric from the mesh support so as to define a conductive grid in the dielectric film on the surface opposite the surface thereof in contact with the mesh support. This target structure in effect forces the charging mechanism to occur in the dielectric between the mesh or grid wires and thus insures "visibility" of the same dielectric areas by both the "reading" and "writing" beams which, prior to their invention, was prevented due to the intervening mesh structure as in the tube of the aforementioned patent to Pensak. The target of Koda and Yaggy also prevents the writing beam electrons from creating electrical interference by being picked up in the output collector on the reading side of the target. In other words, the target of Koda and Yaggy serves to provide complete read-write isolation.

With respect to the scan-converter tubes of the prior art utilizing perforated storage target structures, the operation depends upon the transmission of electrons through the interstices of the target to achieve modulation of such transmission by the charges stored on the target surrounding the interstices. Among the shortcomings of such tubes is the fragility of the mesh member. Since the mesh member in these tubes must be at the focus of the electron beam, the mesh must have a very fine pitch. The mesh member must also be relatively transparent so that near-zero potential charges on the dielectric will allow the maximum number of electrons to pass through the interstices in the "reading" process. Hence, such mesh members must be quite thin and are thus extremely fragile. The mesh member in one currently available tube has a thousand pitch mesh or 25 micron spacing between the mesh wires or strips, each mesh strip being 5 microns wide and only about 2.5 microns thick.

Another difficulty with such typical target meshes is their susceptibility to vibration. Although of low inertia, these meshes tend to vibrate with rather large excursions when subjected to shock and vibration. In some cases they have been known to rupture due to the stresses incurred. These meshes have also been found susceptible to shock excitation and subsequent mechanical ringing when sudden changes in electrical stresses induced by modes switching are incurred.

Still a third difficulty with target meshes lies in the fabrication process itself. Typically, these meshes are made by selectively plating or vacuum depositing metal onto a substrate which is then peeled off as a mesh. Because of such processing, the mesh apertures are often nonuniform; the mesh itself is stretched and requires extreme care in the handling and processing involved in order to be useful in a cathode-ray tube.

With the exception of the storage tube of the aforementioned patent of Koda and Yaggy, the storage targets have one common characteristic the dielectric is usually a thin coating and when scanned by an electron beam, dielectric charging takes place in the thickness dimension of the dielectric coating; that is, along the axis of the electron beam transmission. This feature gives rise to relatively high capacitance in the target, since the dielectric coating is, as stated, usually very thin. To some extent, this intrinsically limits the writing speed in such storage tubes.

SUMMARY OF THE INVENTION

It is therefore an object of the present invention to provide an improved scan-converting system incorporating a barrier grid-type storage tube.

Another object of the invention is to provide an improved scan converting system having an improved storage target for storage tubes of the scan converter type.

Still another object of the invention is to provide an improved scan converting system having an improved, ruggedized storage target for scan-converter storage tubes in which dielectric charging occurs transverse to the axis of the scanning electron beam.

A further object of the invention is to provide an improved scan converting system in which priming is accomplished through capacitance coupling and interelement potential switching without the use of an electron beam.

These and other objects and advantages of the invention are realized by providing a storage tube having a unique dielectric storage target. The storage target comprises a thin dielectric sheet of quartz, for example, backed by a conductive layer on a suitable substrate, the dielectric sheet being characterized by having high electrical resistivity. On the exposed surface of this dielectric sheet a metallic grid is formed so that the dielectric surface remains exposed between the metal strips forming the grid. The surface of the target on which the grid is formed is disposed in a tube having a single-electron gun so that this grid surface faces the scanning electron gun. Different potentials applied to this grid and conductive backing layer determine whether the system is set to prime, write, read, or erase.

BRIEF DESCRIPTION OF THE DRAWINGS

Referring now to FIG. 1, the system of the invention is shown comprising a cathode-ray storage tube with a tubular envelope 8 of electrically insulating material such as glass, for example, in one end of which is disposed a conventional electron gun 7 which is employed for performing both "writing," "reading" and "erasing" functions on a time-shared basis. Also shown is a collimating lens 9 for collimating the electron beam formed by the electron gun 7. Deflection means or plates 14 and 14' are also provided for the gun 7 in order to orthogonally deflect the electron beam produced by the gun 7. Magnetic deflection means such as electromagnetic coils may also be used in place of the electrostatic deflection plate system shown. All of these components and their operation and functions are well understood in the art of electron tube optics, and further detailed description thereof is not deemed necessary herein. Near the end of the tubular envelope 8 and remote from the end thereof containing the electron gun 7, a target member 2 is disposed with the storage surface thereof facing the electron gun 7.

Figure 1:
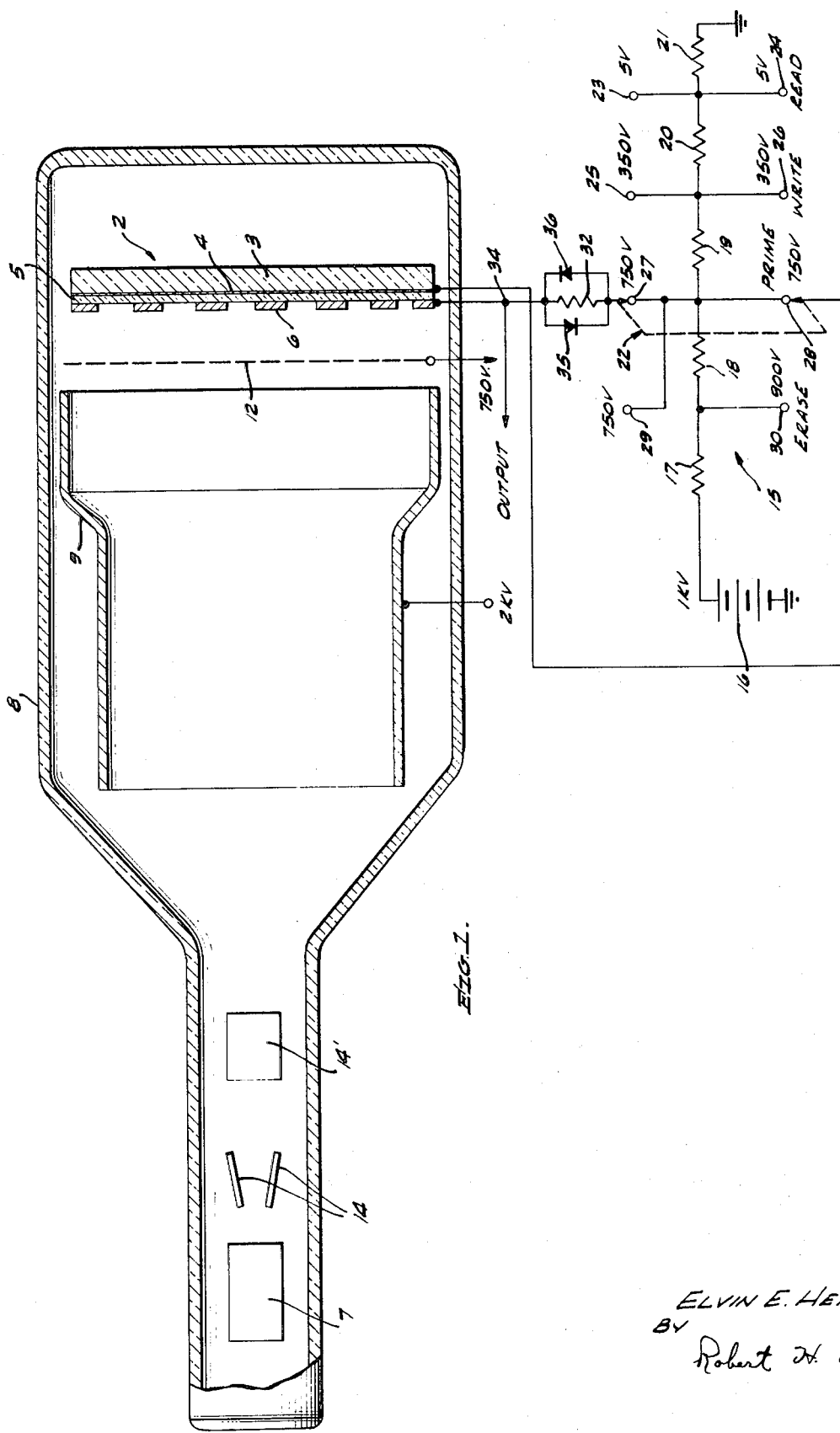
FIG. 1 is a schematic circuit diagram of the system with an elevational view, partly in section, of a single-ended or single-gun scan converter tube.

Also in the tube envelope 8 is a decelerator electrode 12 positioned between the electron gun 7 and the target member 2. The electrode member 12 is disposed adjacent the storage target member 2 and is spaced about one-tenth of an inch therefrom, for example. Such an electrode may comprise a conductive screen having as high a transparency to electrons as possible. Typically the electron transparency or transmission value of this electrode may be 40–50 percent.

Figure 2:
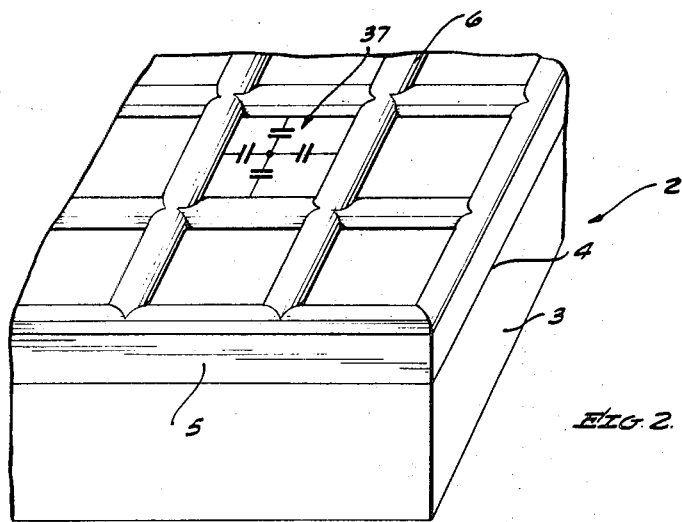
FIG. 2 is a perspective view, partly in section, of a portion of the storage target in the tube of FIG. 1.
Figure 3:
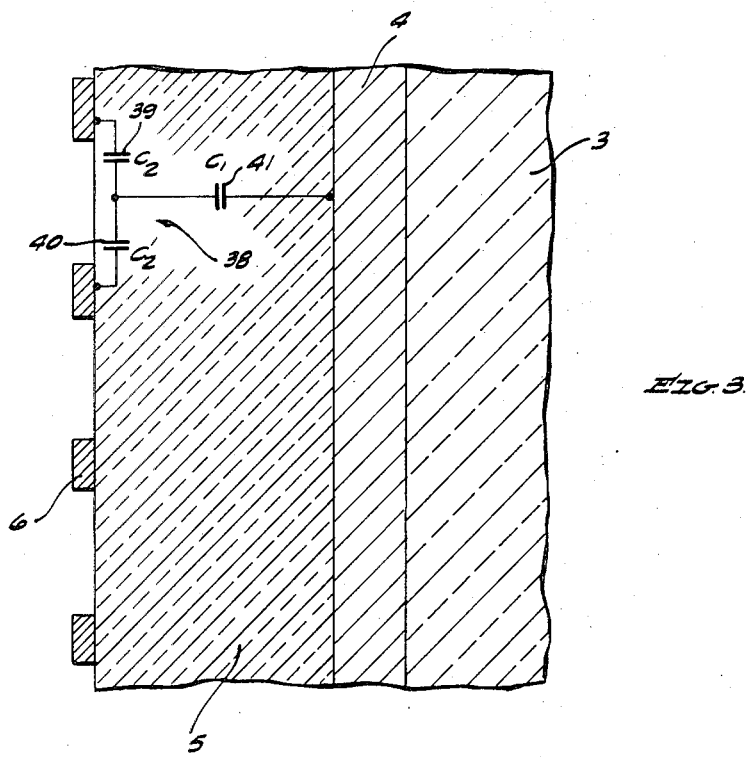
FIG. 3 is an enlarged cross-sectional view of a portion of the storage target of the tube in FIG. 1.

Referring to FIGS. 2 and 3, a portion of the storage target 2 is shown as comprising a metal or dielectric substrate member 3 having thereon and in physical contact therewith an electrically conductive layer or backing electrode 4. A thin dielectric sheet 5 is disposed coextensively over the exposed surface of backing electrode 4. The thin dielectric sheet 5 has thereon and in physical contact therewith an electrically conductive grid 6. The substrate member 3 may be a dielectric such as quartz or metal, for example, and of any thickness as determined by the mechanical properties desired. Typically the substrate 3 may be one-eighth of an inch in thickness. The electrically conductive layer may be combined with substrate 3 or may be an evaporated metal film or transparent conductive coating on glass. The thin dielectric sheet 5 is of the order of 3.5 mils thick and may be fabricated from quartz, mica, glass, or other high resistivity dielectric materials, and having a secondary emissive ratio of two or higher. Typically, the volume resistivity of fused silica (quartz) is about $10^{18}$ ohm-cm., which makes it eminently satisfactory for the purposes of the present invention. The grid 6 may be of gold, for example, and about $10^4$ A thick. Other suitable materials for the grid are molybdenum and nickel. While the target will be described herein as a mesh of intersecting electrically conductive lines or strips, it is to be understood that an array of parallel conductive strips may also be used. Hence, the term "grid" as used herein and in the appended claims is intended to include an electrode member in the form of a mesh of intersecting conductive lines as well as an array of parallel conductive lines.

There are a number of techniques available for fabricating such a target assembly. Thus, the conventional photoresist process may be employed to form a grid pattern in photoresist polymer material in accordance with optical exposure from a photographic master. After development of the photoresist to form a desired pattern consisting of an exposed gridlike format, metal may be vapor-deposited onto the exposed areas of the dielectric sheet 5 through the openings in the photoresist pattern. The final step would be the removal of the polymer film as by conventional photoresist film solvents. Alternatively, the metal to form the grid may be vapor-deposited initially over the entire surface of the thin dielectric layer 5 after which a photoresist pattern consisting of an array of lines of photoresist material is formed so as to permit removal of the metal as desired at exposed areas between the photoresist lines to leave a grid of metal in situ on the substrate. The metal may be removed by chemical etching or by ion beam sputtering. Still another method for laying down and forming the metal strips or grid in a precise fashion is that of nucleation image formation and development as disclosed in a copending application, Ser. No. 839,271, by A. F. and E. E. Kaspaul, assigned to the instant assignee. In this method, the substrate member 5 would be scanned with a focused electron beam in accordance with the grid pattern to be formed. The surface of the substrate member is thereby sensitized and upon exposure to the vapors of the metal to be used for forming the grid, atoms of the metal are deposited and grow, or nucleate, only at those portions of the substrate surface which have been so sensitized. For a more detailed explanation of this process, reference may be had to the aforementioned application.

Referring again to FIG. 1, a resistor-divider network 15 is connected from a 1 kilovolt potential source 16 to ground. Resistor-divider network 15 includes serially connected resistors 17, 18, 19, 20 and 21 with values selected to provide potentials 900$^{v.}$, 750$^{v.}$, 350$^{v.}$, and 5$^{v.}$. A two-gang switch 22 has read contacts 23, 24; write contacts 25, 26; prime contacts 27, 28; and erase contacts 29, 30, each set of which is ganged together. Read contacts 23, 24 are connected to the 5$^{v.}$ terminal of resistor-divider network 15; write contacts 25, 26 are connected to the 350$^{v.}$ terminal of resistor-divider network 15; prime contacts 27, 28 are both connected to the 750$^{v.}$ terminal of resistor-divider network 15; and the erase contacts 29, 30 are connected to the 750$^{v.}$ and 900$^{v.}$ terminals, respectively, of resistor-divider network 15. The contacts 23, 25, 27, 29 are selectively connected through an output resistor 32 to the grid 6 of target assembly 2. An output terminal 34 is available directly from the grid 6. Contacts 24, 26, 28, 30, on the other hand, are ganged with the contacts 23, 25, 27, 29 and connect to the conductive layer or backing electrode 5. Thus in the "prime" position 750$^{v.}$ is applied to both grid 6 and backing electrode 4; in the "write" position 350$^{v.}$ is applied to both grid 6 and backing electrode 4; in the "read" position 5$^{v.}$ is applied to both grid 6 and backing electrode 4; and in the "erase" position 750$^{v.}$ is applied to grid 6 and 900$^{v.}$ to backing electrode 4. It is to be understood that this switching may be done electronically as well as mechanically.

It may be desirable in facilitating rapid mode switching, to provide silicon diodes 35, 36 connected back-to-back across resistor 32. For the typical low level signal outputs, neither of these silicon diodes 35 or 36 conduct. During mode switching, however, silicon diodes 35 or 36 conduct thereby providing a low resistance path through which to rapidly discharge the interelement capacitance between grid 6 and backing electrode 4. Thus, silicon diodes 35, 36 provide for more rapid electrode voltage stabilization following mode switching.

In copending application for patent, Ser. No. 688,749, assigned to the same assignee as is the present case, both erase and prime modes were required. The erase mode effectively "writes" the entire storage surface of the target assembly more positively and uniformly to saturation. In the copending case, as well as in conventional tubes, the prime mode shifts the storage surface potential uniformly more negatively with respect to the surface mesh by means of a low velocity electron beam in order to prepare for the subsequent writing process wherein dielectric areas of storage surface are selectively charged back upwards in accordance with the magnitude of signals to be recorded. The low velocity beam priming process is asymptotic; i.e., the closer the surface potential approaches that of the cathode, the fewer primary electrons available to land and complete the priming process. Thus relatively high beam currents are required for the priming function. In the present case, the priming process is accomplished not by the utilization of a low velocity electron beam, but by means of a switched potential applied to backing electrode 4 of target assembly 2 as will be hereinafter described in more detail.

It will be understood that the dielectric material has a secondary emission ratio in response to electron beam bombardment, which ratio is greater than unity for beam velocities above a predetermined level and which ratio is less than unity for beam velocities below such predetermined level. With reference to FIG. 2, the charging process during the writing mode is transverse, meaning that the electron beam charges the dielectric area between the metal strips as shown in approximate equivalent circuit form 37 in FIG. 2. As the regions between metal strips of grid 6 charge transversely, there is also an incidental and lesser voltage gradient in the depth dimension of the dielectric because the dielectric is quite thick relative to the space between the metal conducting strips of the grid 6. Thus, at every depth plane some transverse charging occurs but to a progressively lesser extent due to capacitance division in the depth plane.

ERASURE

To prepare the target for writing information, any previously inadvertent or stored charges should be erased. This is accomplished simply by switching switch 22 to contacts 29, 30, thereby applying 750$^{v.}$ to grid 6 relative to the cathode voltage of gun 7 whereby the dielectric surface, by capacity coupling, is elevated well above the first crossover point for the arriving primary electrons. The backing electrode 4 is simultaneously raised to 900$^{v.}$. The electron beam is then scanned over the surface and all elements of the exposed dielectric are transferred to so-called collector equilibrium, in this case, the potential of the mesh 6. If any point tends to rise above mesh 6 potential, the secondary electrons are suppressed and the point is returned downward; correspondingly, if any point lies below the mesh potential, the escaping secondary electrons cause the surface to rise upward to the mesh potential. Since the surface mesh 6 is adjacent and essentially coplanar to the dielectric of layer 5 as opposed to the decelerator 12, this surface mesh 6 serves as the predominant collection field. During the time that the mesh is at (positive) 750 v., the metallic conducting surface on the rear of the dielectric; i.e., backing electrode 4, can be held at perhaps 900 v. All voltages are stated with reference to cathode potential of gun 7.

PRIMING

In order to write electrical information into the scan conversion system of the invention, the storage surface of the storage target 2 must be at a uniform negative potential relative to the surface grid 6. The process of setting this negative potential prior to writing is called "priming." Using the cathode of the electron gun 7 as a "zero" voltage reference point, a potential of about 750 v. positive is maintained on the decelerator mesh 12. After the erasure process is completed, the tube is then primed without utilizing the electron beam by switching the metallized backing electrode 4 negatively by 150 v., i.e., from 900 v. down to 750 v. by switching switch 22 to contacts 27, 28. In effect, the target structure amounts to a capacitance divider, as shown by the equivalent circuit 38 made up of capacitors 39, 40, 41 in FIG. 3. In particular, the large spacing between the metallic backing electrode 4 and the surface of the dielectric layer 5 comprises the small capacitor 41 designated $C_1$ of the divider, while the larger capacitances 39, 40, designated $C_2$ and $C'_2$, respectively, along the surface of the dielectric layer 5 over to the adjoining mesh 6 are by far the larger. The ratio of these capacitances may be of the order of 10 to one, since the spacing from the midpoint on the dielectric surface to the adjoining mesh 6 is perhaps 8 microns, while the thickness of the dielectric layer 5 might be 80 microns; i.e., about 3½ mils. The net result of having switched the backing electrode layer 4 negatively by 150 v. relative to the surface mesh 6 is to give rise to a negative shift at the center of the exposed surface of the dielectric layer 5 of approximately one-tenth of 150 v. or 15 v. In this way, by capacitance coupling, through the capacitance division, there will be accomplished the requisite negative shift on the dielectric surface, thus performing the prime function without resort to the electron beam during this priming process.

WRITING

To "write" information on the storage target, the storage grid 6 and backing electrode 4 are both switched to a potential which is well above the first crossover point, e.g., about 350 v. positive, by switching to contacts 25, 26, taking with them by capacitance coupling the dielectric elements of layer 5 by a corresponding amount. This retains the 15 v. negative potential at the center of the exposed dielectric surface relative to the surrounding mesh. The signal to be recorded may be applied by intensity modulating the writing electron beam. Alternatively, the beam may be width-modulated or deflection-speed-modulated in accordance with the electrical signals to be stored. Thus, according to the signal level, and by modulating the electron beam, secondary electron emission will occur from the exposed dielectric surface in accordance with electron beam scansion thereof, resulting in positive charging of the dielectric elements toward the potential of the grid wires or strips surrounding each exposed dielectric element.

READING

Upon completion of the writing process and preparatory to reading out stored signals, the potential of the storage grid 6 and backing electrode 4 are shifted together downward to a potential of the order of +5 v. which is below the first crossover point of the secondary emission curve by switching to contacts 23, 24. By capacity coupling, all dielectric elements are again shifted downwards by a corresponding amount. Specifically, the grid 6 is shifted downward in potential to a value such that all dielectric elements arrive ultimately at a potential slightly below that of the cathode potential, ranging downward from this potential depending inversely upon the amount of charge recorded during the writing period. At the same time the surface grid 6 is at a potential somewhat above zero (cathode potential) e.g., about +5 v.

To read the stored information or signals, the target is scanned with the electron beam from the gun 7. As the electron beam encounters the various transverse negative charges of the dielectric elements lying between metal strips of the surface grid 6, these charges serve to control by electron mirror action the relative number of electrons allowed to land on the metal strips versus those repelled back to the decelerator electrode 12 where they are collected. Reading is thus accomplished by selective control of the number of electrons repelled back to the decelerator electrode 12 versus the number allowed to land on the metal strips of the surface grid 6. Output signals can therefore be derived from either the target grid 6 itself or from the decelerator mesh 12. Signal output from the decelerator electrode 12 would, however, have a "DC" factor due to the interception of electrons directly as they pass from the cathode to the target.

In summary, in the proposed scan conversion system with its target structure as described, erasure is accomplished by writing all dielectric elements to collector equilibrium, but the prime function is accomplished without resort to the electron beam but instead through element potential switching and capacitance division. By resorting only to the capacitance division with the potential switching on the backing electrode, the prime process does not require high cathode currents and would be completely uniform, thus avoiding any shading difficulties attributable to priming.

What is claimed is:

1. A scan conversion system including an electronic tube for storing electrical input signals and providing electrical output signals corresponding thereto, said tube comprising a thin dielectric sheet having a secondary electron emission ratio greater than unity between first and second predetermined voltages, a backing electrode on one side of said thin dielectric sheet and an electrically conductive grid electrode member on the opposite side thereof, thereby to provide a target assembly, an electron beam producing means for writing information on said target assembly and for reading said information stored thereon, said electron beam producing means facing and being adapted to scan the side of said target assembly on which said grid electrode member is disposed, and a decelerator member disposed between said beam producing means and said target assembly; means for maintaining said backing electrode and said electrically conductive grid at fixed potentials, the potential of said electrically conductive grid being between said first and second predetermined voltages; means for scanning said target assembly with said electron beam producing means thereby to erase the storage surface thereof; and thereafter, means for reducing the potential applied to said backing electrode thereby to prime the storage surface of said target assembly without further use of said beam-producing means.

2. The scan conversion system as defined in claim 1 wherein said thin dielectric sheet is typically greater than 3 and less than 6 mils thick.

3. The scan conversion system as defined in claim 1 wherein said thin dielectric sheet is composed of quartz.

4. The scan conversion system as defined in claim 1 wherein the potential applied to aid backing electrode is reduced substantially 10 times the amplitude of the voltage required to prime the storage surface of said target assembly.

5. A scan conversion system including an electronic tube for storing electrical input signals and providing electrical output signals corresponding thereto, said tube comprising a thin dielectric sheet having a secondary electron emission ratio greater than unity between first and second predetermined voltages, a backing electrode on one side of said thin dielectric sheet and an electrically conductive grid electrode member on the opposite side thereof, thereby to provide a target assembly, an electron beam producing means for writing information on said target assembly and for reading said information stored thereon, said electron beam producing means facing and being adapted to scan the side of said target assembly on which said grid electrode member is disposed, and a decelerator member disposed between said beam producing means and said target assembly; an output resistor connected to said electrically conductive grid electrode member; means connected to said backing electrode and through said output resistor to said electrically conductive grid electrode member for maintaining said backing electrode and said electrically conductive grid at fixed potentials, the potential of said electrically conductive grid being between said first and second predetermined voltages; means for scanning said target assembly with said electron beam producing means thereby to erase the storage surface thereof; and thereafter, means for reducing the potential applied to said backing electrode thereby to prime the storage surface of said target assembly without further use of said beam-producing means.

6. The scan conversion system as defined in claim 5 additionally including first and second silicon diodes connected back-to-back across said output resistor thereby to provide for more rapid voltage stabilization on said backing electrode and said electrically conductive grid electrode member following mode switching.

* * * * *

PO-1050
(5/69)

UNITED STATES PATENT OFFICE
CERTIFICATE OF CORRECTION

Patent No. 3,633,064     Dated January 4, 1972

Inventor(s) Elvin E. Herman

It is certified that error appears in the above-identified patent and that said Letters Patent are hereby corrected as shown below:

Col. 1, line 8 :   "readout" should be written -- read out --

Col. 1, line 22:   "one-thirteenth" should read
                   -- one-thirtieth --

Col. 3, line 17:   after "characteristic" should be inserted
                   a colon (:)

Col. 3, line 53:   "single-electron" should read
                   -- single electron --

Col. 5, line 41:   "688,749" should read -- 688,479 --

Col. 8, line 24:   "aid" should read -- said --

Signed and sealed this 4th day of July 1972.

(SEAL)
Attest:

EDWARD M. FLETCHER, JR.              ROBERT GOTTSCHALK
Attesting Officer                    Commissioner of Patents